United States Patent [19]

Schlanger

[11] Patent Number: 4,566,555

[45] Date of Patent: * Jan. 28, 1986

[54] VEHICLE CONTROL SAFETY SYSTEM

[76] Inventor: Samuel L. Schlanger, 140 Cheyenne Way, Wayne, N.J. 07470

[*] Notice: The portion of the term of this patent subsequent to Oct. 25, 2000 has been disclaimed.

[21] Appl. No.: 579,690

[22] Filed: Feb. 13, 1984

[51] Int. Cl.[4] ............................................. B60R 21/00
[52] U.S. Cl. .................................... 180/274; 280/703; 280/777; 293/132; 296/35.2
[58] Field of Search .................. 180/274, 41; 280/6 R, 280/6.1, 703, 734, 777, DIG. 1; 296/35.2, 65 R, 65 A; 293/118, 132; 74/493

[56] References Cited

U.S. PATENT DOCUMENTS 4,143,735 3/1979 Schlanger ............................ 180/274
4,411,334 10/1983 Schlanger ............................ 180/274
4,413,702 11/1983 Schlanger ............................ 180/274

Primary Examiner—David M. Mitchell
Assistant Examiner—Mitchell J. Hill
Attorney, Agent, or Firm—Collard, Roe & Galgano

[57] ABSTRACT

A safety system for a vehicle, which has a chassis with two parallel spaced-apart horizontal legs, and an axle assembly for each wheel, includes a suspension assembly with at least one cylinder, and an air piston reciprocally movable in the cylinder, the cylinder pivotably connected to the chassis and the air piston connected to one of the axle assemblies. The cylinder is formed with at least one air excape opening. A valve is provided for selectively opening and closing the air escape opening so as to permit or arrest the air piston arrestor in the cylinder, and to maintain it in a relatively rigid, non-compressible state when the air escape opening is closed. A resilient spring biases the valve to the open position, and means are provided for activating the valve. At least one bumper assembly is provided, which includes a short stroke retractable bumper slidably mounted on the chassis for movement between a normal, extended position and a retracted position, a pair of generally parallel, spaced-apart hollow support arms, each of which may be mounted on one of the chassis legs, and a pair of generally parallel, spaced-apart rods connected to the bumper, each of which is telescopically received in a corresponding one of the hollow support arms.

28 Claims, 24 Drawing Figures

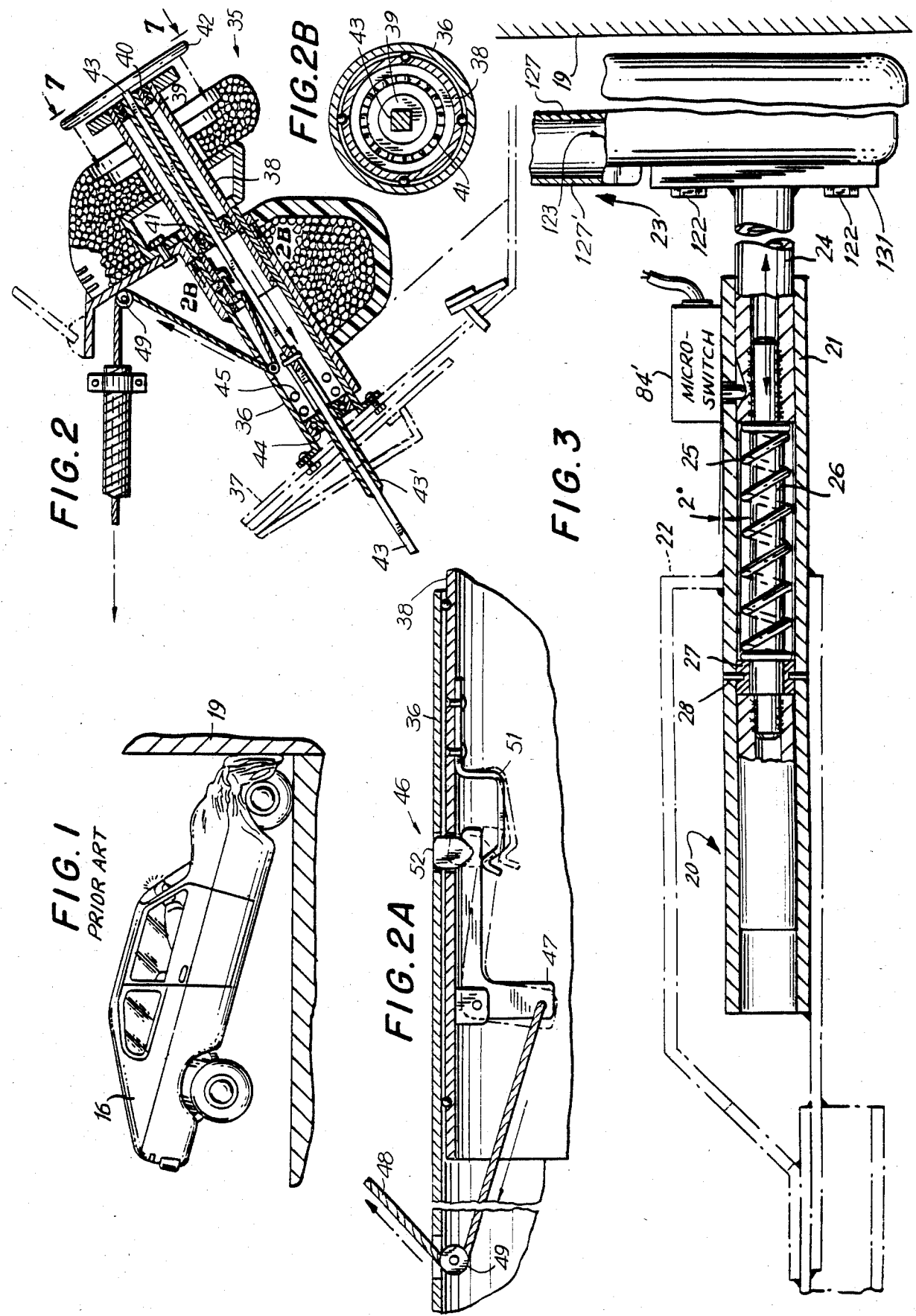

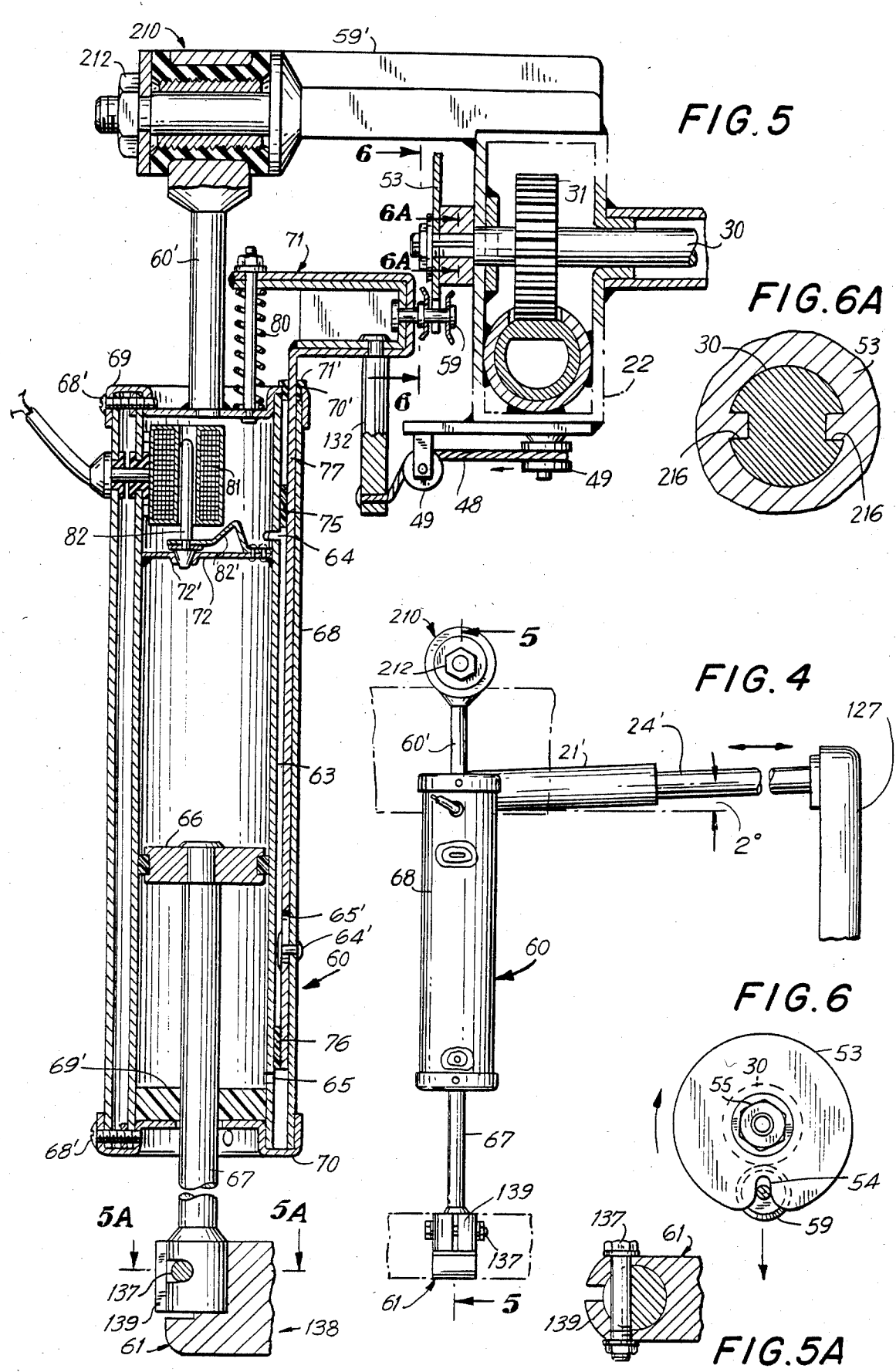

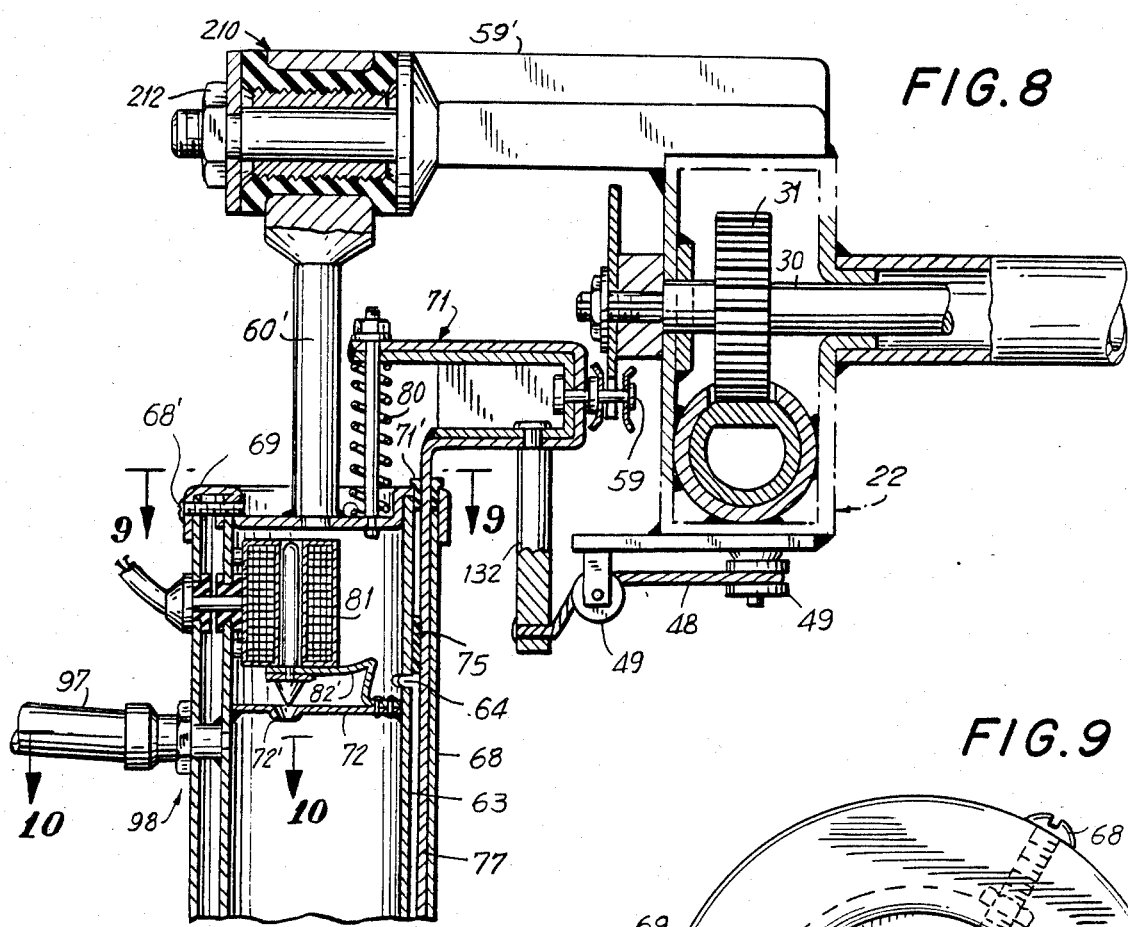
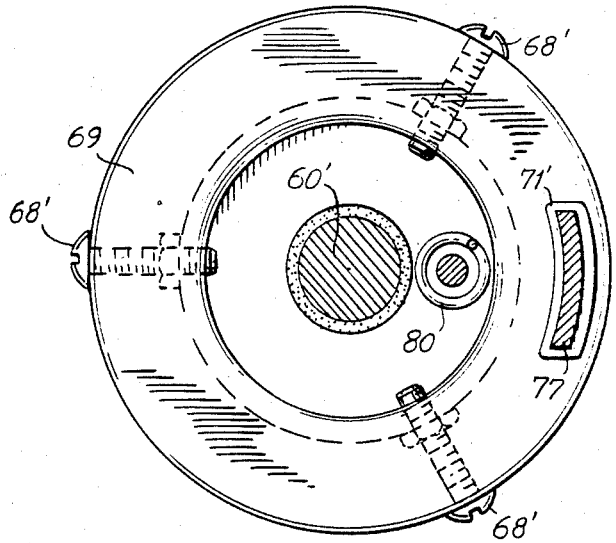
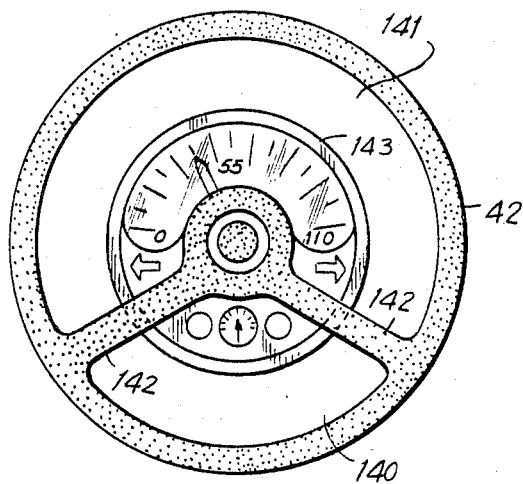
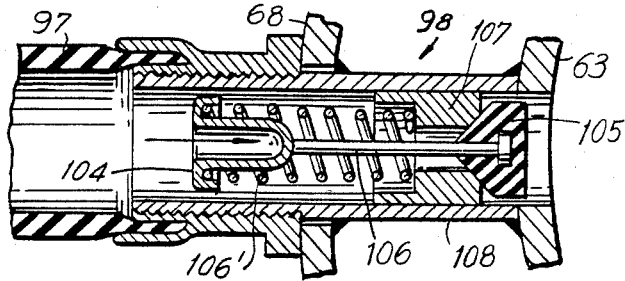

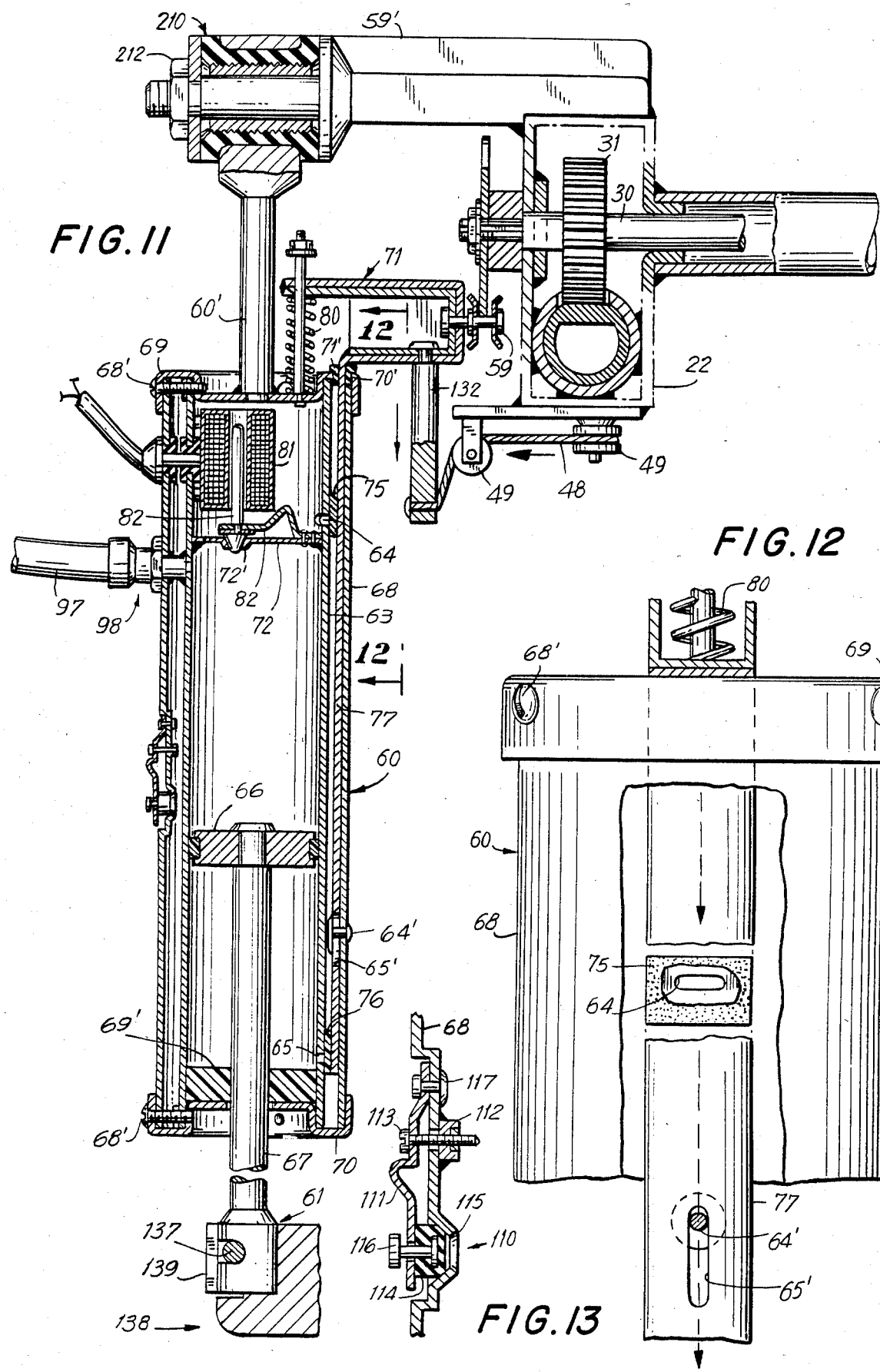

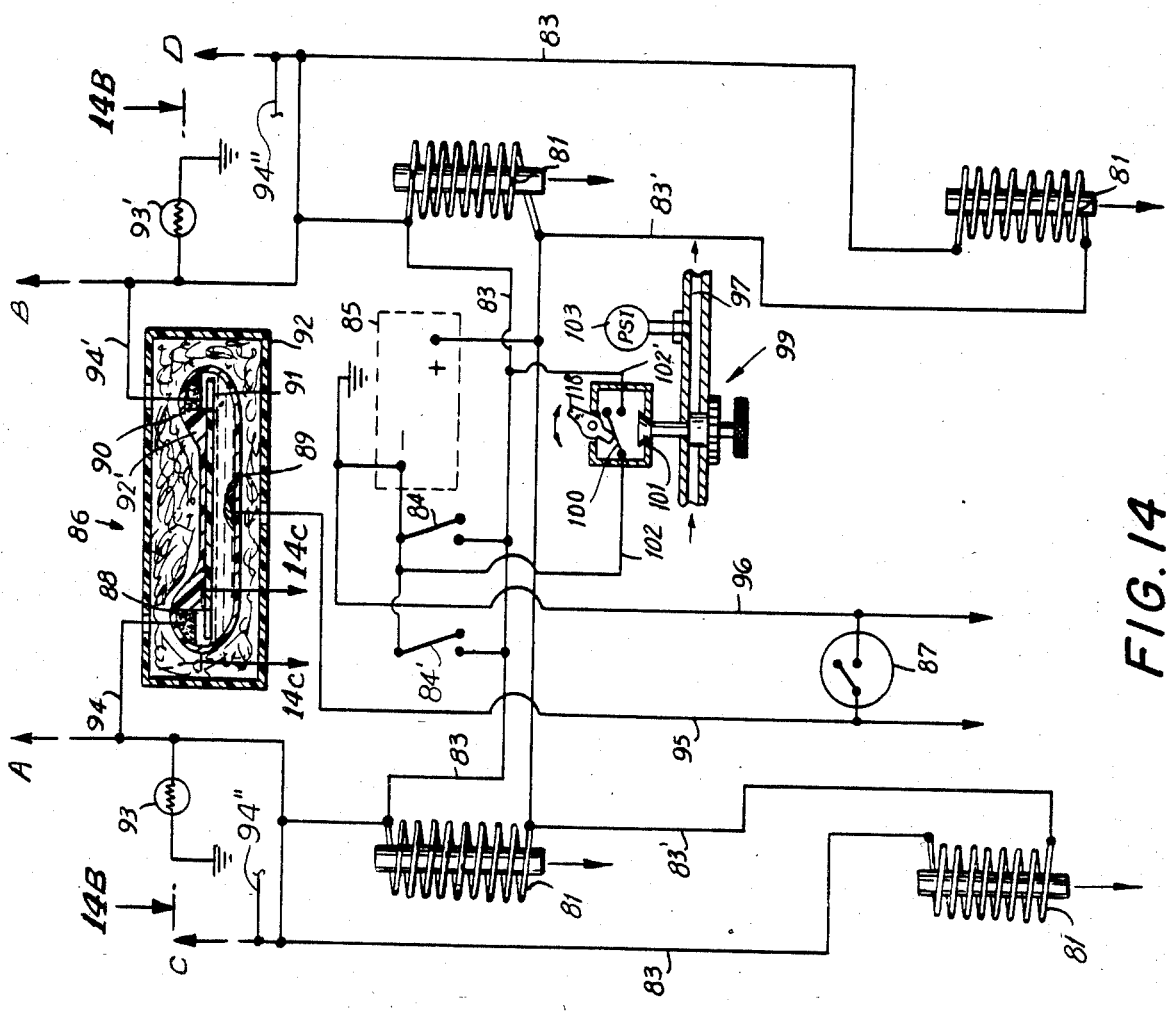
FIG. 14
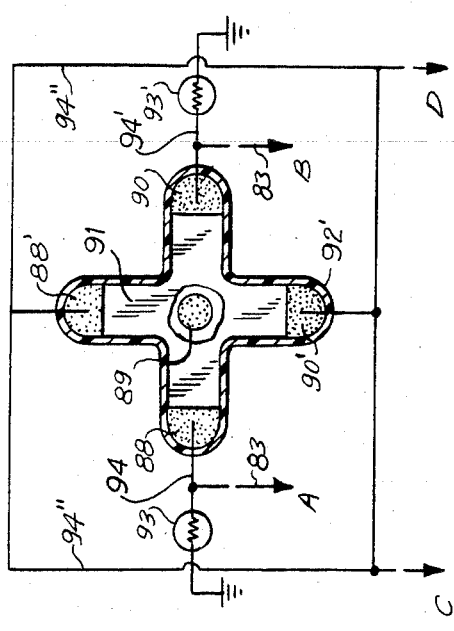
FIG.14C
FIG.14B
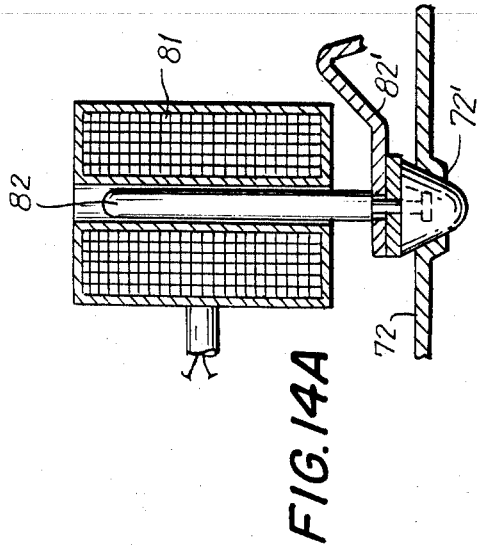
FIG.14A

VEHICLE CONTROL SAFETY SYSTEM

REFERENCES TO RELATED APPLICATIONS

Reference is made to my co-pending application entitled "Passenger Restraint Safety System", U.S. Ser. No. 579,689, filed Feb. 13, 1984 the subject matter of which is incorporated herein by reference.

BACKGROUND OF THE INVENTION

This invention relates to a safety system for vehicles. More particularly, it relates to an improved and simplified anti-nose-dive, anti-sway and anti-rocking safety system for vehicles.

Today, there is an increased awareness of the need for safer vehicles and, in particular, those used as passenger cars, so as to reduce the incidence of occupant fatalities and injuries resulting from front end and rear end collisions. This has led to the development of improved bumper systems which are designed to absorb the force of impact of a car traveling at speeds of up to 2.5 m.p.h., without damage to the car's body.

This has also led to the development of air-bags which, located only in the front seat compartment, are designed to inflate upon impact of a collision, to prevent the driver and front seat passenger from being thrown forward against the windshield of the car, typically as a result of the front end of the car dipping upon impact. Impact absorbing steering wheels and padded dashboards have also been incorporated into new car models to further reduce the risk of injury during a collision.

While safety devices of this type have been found acceptable for vehicles travelling at relatively slow speeds, there has been general concern about their effectiveness at normal cruising speeds. Moreover, while these safety devices serve to minimize the adverse effects of the car nose-diving upon impact, none directly address this serious problem, a built-in hazard resulting from the design of the vehicle's chassis suspension systems.

An anti-nose-dive system which dealt directly with this problem is disclosed in my prior U.S. Pat. No. 4,143,735, granted Mar. 13, 1979. This patent discloses a system which, upon impact of a collision, arrests the front end suspension system in a relatively rigid state and jacks up the front end of the car by means of a gear assembly, so as to prevent the car from nose-diving.

SUMMARY OF THE INVENTION

The present invention is an improvement of the anti-nose-diving safety system disclosed in my aforesaid patent which eliminates the costly car-raising gear assembly while still serving to prevent front end nose-diving and which also affords both front and rear end protection via an improved bumper assembly and which also affords anti-sway and anti-rocking stabilization for the vehicle.

Accordingly, it is an object of the present invention to provide a novel safety system for vehicles which eliminates the problem of vehicle nose-diving upon collision, while also stabilizing the vehicle for smooth riding comfort and safety, which provides greater vehicle occupant protection in both front and rear end collisions, and which better controls the vehicle's equilibrium.

It is also an object of the present invention to provide such a safety system which is effective at normal cruising speeds so as to minimize the possibility of occupant fatalities and injuries and minimize severe whiplash, resulting from front end and head-on collisions.

It is a further object of the present invention to provide such a safety system which is relatively simple in design, economical to fabricate, durable, reliable in operation and which is readily adaptable for mass production on conventional vehicles.

It is still another object of the present invention to provide such a safety system which can raise the vehicle chassis together with the passenger compartment and which would also eliminate the need for conventional anti-sway or anti-roll bars while still minimizing car swaying, so as to prevent rocking of the driver and passengers when making emergency short stops, and automatically control roll-over of the vehicle, for example, in panic braking, when rounding sharp curves, and in case severe cross-winds are encountered.

It is a further object of the present invention to provide a circular instrument panel, with an optional magnifying glass face, condensed for reading at a glance, which is placed at the steering wheel column hub.

It is also a particular object of the present invention to provide a safety system with the foregoing attributes and characteristics which is provided with wheel damping "air piston arrestors" and which serves to improve road traction and decrease emergency braking distances.

Certain of the foregoing and related objects are readily attained in a safety system for a vehicle having a chassis frame with two parallel spaced-apart substantially horizontal legs and an axle assembly for each of the wheels, which includes a suspension assembly including at least one air cylinder and an air piston reciprocally movable in the cylinder, the cylinder being pivotably connected to the chassis frame and the piston being pivotably connected to one of the vehicle axle assemblies, the cylinder being formed with at least one air port opening, valve means for selectively opening and closing the air port opening so as to permit or arrest movement of the air piston in the cylinder, and to maintain it in a relatively rigid, non-compressible state when the air port opening is closed, including biasing means biasing the valve means to the open position, means for activating the closing of said valve means, and a retractable safety bumper assembly.

The retractable bumper assembly advantageously includes at least one bumper bar including a short stroke retractable bumper assembly slidably mounted on the chassis frame for movement between a normal, extended position and a retracted position. The bumper assembly includes a pair of generally parallel, spaced-apart hollow support arms, each of which is mountable on one of the chassis frame legs, and a pair of generally parallel, spaced-apart rods, each of which is telescopically received in one of the hollow support arms. The bumper assembly with a large extended upper surface area, complete with grille and retractable bumper guards, is advantageously engineered for effective safety, taking into account possible collisions with trucks and trailers in frontal and rear-end impacts.

While the safety control system is primarily intended for automobiles, it may also be ideal for railway trains. The air piston arrestors can be activated by mercury switch sensors to prevent swaying of railway passenger cars for the smooth riding comfort of passengers. Such a system would also provide improved safety for railway tank cars, box cars, etc. by locking in a rigid manner the truck (undercarriage) spring suspension systems, when rounding curves of railroad tracks. The air piston arrestors, operated by compressed air or by the use of hydraulics, etc. and activated by the mercury switch sensor, as a result of their holding action, would place the weight and load of the cars directly onto the axle which prevents the train's wheels with its wheel flanges from jumpng off the railroad track.

The mercury switch sensor may, of course, also be used in an automobile to arrest the air piston arrestors automatically on cornering and on curves in the road. In addition, to automatically control car roll-over when the driver steps on the brake pedal while rounding sharp curves, in an emergency panic situation during highway cruising, a foot brake micro switch electrical system may be provided for activating the air piston arrestors as well.

For firmer control in cornering, additional mercury switch sensors may be mounted under the left and right front fenders and connected into the electrical (solenoid) circuit, thus arresting the piston heads of the air piston arrestors.

With conventional vehicles, in frontal and rear end collisions, the chassis spring suspension systems collapse and then rebound, thereby producing a springboard effect, which throws the occupants against structural members of the car, causing the occupants to suffer fatal or critical bodily injury, as well as severe neck and back whiplash. The present safety system with the "air piston arrestors" controls this condition for the protection of the driver and passengers.

The pneumatic "air piston arrestors" can be made operational, as an alternative, by using in the cylinders hydraulic fluid, gases, etc., instead of air pressure.

The safety system may also include direct mechanical linkage for instant and automatic operation, upon frontal and/or rear end impacts, so as to maintain bumper height by the use of such locking or arresting devices designed to prevent the suspension systems from collapsing of both the aggressive and the struck vehicles, thereby avoiding the over-riding or under-riding of bumpers and thereby greatly reducing major damage to autos in a collision.

The safety system operates automatically, upon impact, before any occupants might be severely injured by the crash and the system is not under the driver's control. The safety system can also be made operational electronically by using solid state components, if desired.

BRIEF DESCRIPTION OF THE DRAWINGS

Other objects and features of the present invention will become apparent from the following detailed description when considered in connection with the accompanying drawings which disclose several embodiments of the invention. It is to be understood that the drawings are designed for the purpose of illustration only and are not intended as a definition of the limits of the invention.

In the drawings, wherein similar reference numerals denote similar elements throughout the several views:

FIG. 1 is a side elevational view of a car equipped with a conventional bumper and suspension system showing the front end of the car damaged and nose-diving downwardly after full impact with a wall, with the car's rear axle and wheels off the ground and also showing the driver's head striking the windshield;

FIG. 2 is a fragmentarily-illustrated, longitudinal sectional view showing a collapsible steering wheel column assembly mounted in the forward car compartment, and coupled to an improved bumper safety system of the present invention by means of a cable for cooperation therewith;

FIG. 2A is a large-scale detail of the latch release in the steering column of FIG. 2;

FIG. 2B is an enlarged cross-sectional view along line 2B—2B of FIG. 2;

FIG. 3 is an enlarged, fragmentarily-illustrated sectional view, in part elevation, of a portion of the retractable bumper assembly mounted on the car chassis frame, the latter of which is shown in phantom line;

FIG. 4 is a fragmentarily-illustrated side elevational view of the system's air piston arrestor coupled to the retractable bumper assembly;

FIG. 5 is a fragmentarily-illustrated cross-sectional view, in part elevation, taken along line 5—5 of FIG. 4 with the air port opening formed in the partition of the upper cylinder shown closed, but with the two side air port openings shown in an open position;

FIG. 5a is a cross-sectional view taken along line 5A—5A of FIG. 5;

FIG. 6 is a side elevational view, in part cross-section, taken along line 6—6 of FIG. 5, showing the cam assembly;

FIG. 6a is an enlarged cross-sectional view taken along line 6A—6A of FIG. 5, showing the key slots in the pinion shaft ends;

FIG. 7 is a front elevational view of the steering wheel of vehicle, equipped according to the present invention;

FIG. 8 is a fragmentarily-illustrated cross-sectional view, in part elevation, of the upper portion of the air piston arrestor and the cam triggering assembly comparable to that shown in FIG. 5, but with air port openings shown open, in a normal operating position;

FIG. 9 is an enlarged plan view of the air piston arrestor, in part cross-section, taken along line 9—9 of FIG. 8;

FIG. 10 is an enlarged fragmentarily-illustrated, sectional view of the compressed air line connection and air inlet valve taken along lines 10—10 of FIG. 8;

FIG. 11 is a fragmentarily-illustrated cross-sectional view of the air piston arrestor and cam assembly, comparable to that of FIGS. 5 and 8, but showing all air port openings in a closed position;

FIG. 12 is an enlarged fragmentarily-illustrated side elevational view, in part section, taken along line 12—12 of FIG. 11, but with a portion broken away to show internal constructions;

FIG. 13 is an enlarged fragmentarily-illustrated sectional view, in part elevation, of the air release valve for the air piston arrestors, shown in FIG. 11;

FIG. 14 is an electrical schematic wiring system for activating the solenoid coils operatively coupled to the air piston arrestors for each of the wheels;

FIG. 14A is an enlarged cross-sectional view of the solenoids shown in FIGS. 11 and 14;

FIG. 14B is an electrical schematic wiring system showing the connection of the four-way mercury switch, in the wiring system of FIG. 14;

FIG. 14C is an enlarged cross-sectional view of a portion of the four-way mercury switch of FIG. 14 taken along the line 14C—14C;

DESCRIPTION OF THE PREFERRED EMBODIMENTS

Figure 15:
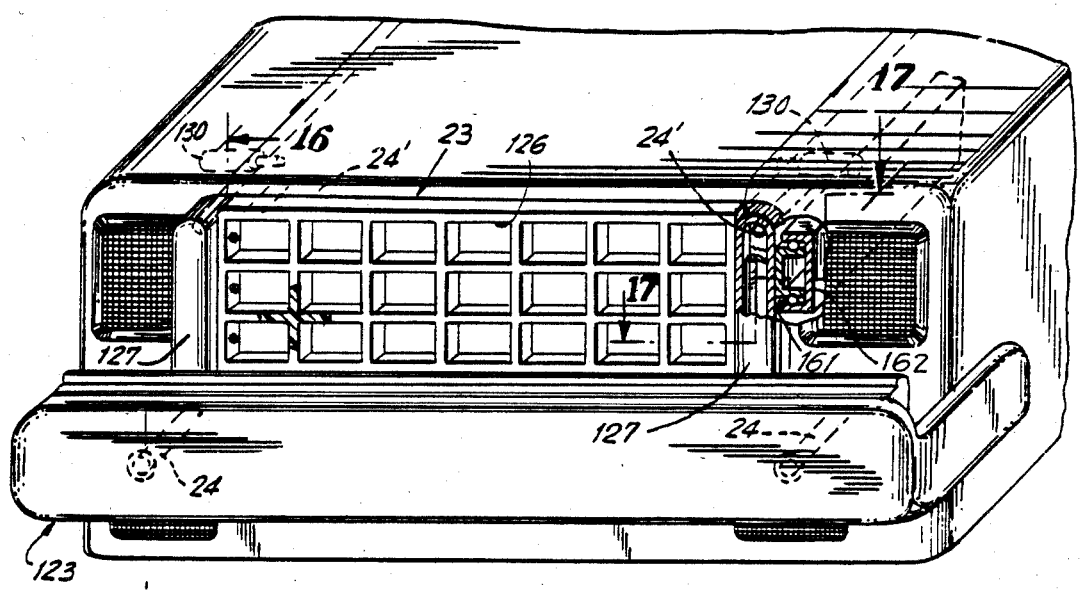
FIG. 15 is a fragmentarily-illustrated, perspective view of the retractable bumper assembly mounted on the front end of the vehicle.

Turning now in detail to the drawings, FIG. 1 illustrates a front end collision involving a conventionally equipped car 16 striking a barrier 19 wherein the front end of the car pitches downwardly or "nose dives" and propels the driver and passengers forwardly towards the front windshield. The remaining figures illustrate various aspects of a novel anti-nose-dive safety system for a vehicle embodying the present invention, which seeks to eliminate this problem.

The safety system includes essentially identical, retractable front and rear bumper assemblies, only the former of which is illustrated in the figures and described herein. More particularly, as can be seen in FIG. 3, the system includes a generally horizontally-disposed retractable front bumper and spring assembly 20 which is coupled to the forward portion of the chassis frame extension leg 22 of the vehicle, at an upward and forward pitch of approximately 2°, so as to provide for an angled blow to thus aid in preventing nose-diving of the car upon impact, in a frontal collision (or for the rear bumper in a rear collision); the chassis frame 22 being illustrated through the various views in phantom line for the purpose of clarity. Front bumper and spring assembly 20 includes a lower and an upper pair of parallel elongated, tubular bumper support arms 21, 21' (see FIGS. 3 and 16), each having a generally cylindrical cross section, which are each welded to an opposite chassis frame extension leg 22, extending forwardly therefrom.

Figure 16:
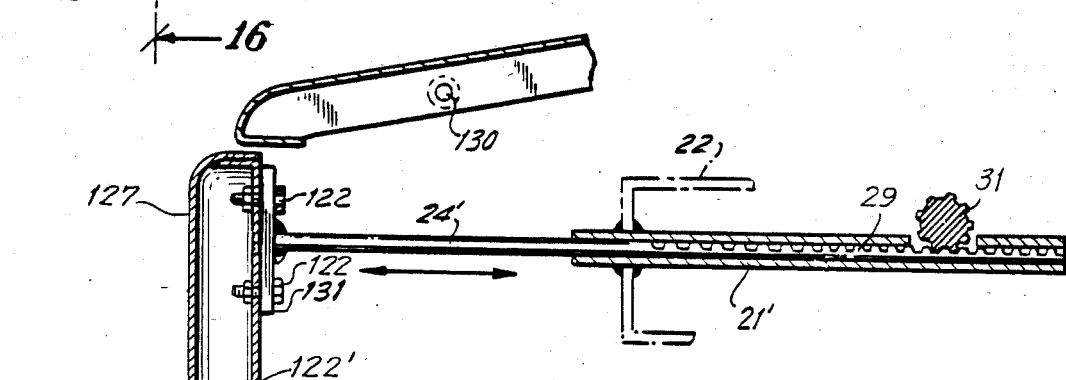
FIG. 16 is an enlarged sectional view of the retractable bumper assembly taken along line 16—16 of FIG. 15.

Bumper and spring assembly 20 also includes a retractable front bumper, generally designated 23, having two vertically spaced-apart pairs of elongated and horizontally spaced-apart, parallel, cylindrical bumper rods 24, 24' horizontally secured to (via bolting) and extending rearwardly from the mounting plates 131 of a main front bumper 123 (see FIGS. 3, 15 and 16). Rods 24, 24' are each slidably and telescopically received in one of the respective support arms 21, 21' for reciprocal movement therein, between a normal extended position and a retracted position; the latter position caused by impact of front bumper 123 with a relatively immovable barrier or with another vehicle in a collision.

Main front bumper 123 is equipped to absorb the force of an impact when the vehicle strikes a barrier while travelling at slow speeds, e.g., up to 5 m.p.h., by means of coil springs 25 (only one of which is shown), each of which is mounted on a connecting rod 26 and is disposed between a support collar 27, held in a fixed position by plug welds or shear pins 28, and the inner end of one of the tubular rods 24, so as to urge rods 24 and main front bumper 123 in an outward direction. As can be appreciated, coil springs 25 will serve to dissipate the force of impact when main front bumper 123 strikes an object and is caused to retract.

As can be seen clearly in FIGS. 15 and 16, the front bumper assembly is composed of a lower bumper frame 120 and extended upper bumper guards 127, which are joined by the mounting plates 131 to bumper rods 24 and 24', respectively, via bolts preferably with captive lock nut and bolt assemblies 122 to allow for easy assembly and replacement of parts. The lower portions of bumper guards 127 complete with back plate or cover 127' are also secured to the lower frame 120 by means of additional bolt assemblies 122', and are fitted into the trough of lower bumper frame 120 which serve to strengthen and rigidify the bumper assembly. This, of course, serves as an additional safety feature for the vehicle. In addition, hood safety latches 130 activated from the passenger compartment could also be used to prevent inadvertent hood release upon collision. Generally U-shaped, wrap-around main bumper 123 is affixed to the lower bumper frame 120. Main bumper 123 consists of a flexible or resilient outer plastic sheath or casing 124 having a reinforced front face (i.e., it may be provided with a relatively harder plastic insert embedded in or laminated thereto). The main bumper 123 is further filled with a foam plastic material 125 such as polyurethane, so as to cushion any impact. As seen in FIG. 16, the bumper 123 is provided with a frustoconical rear section by which it is seated and secured in a correspondingly configured section of lower frame 120.

Figure 17:
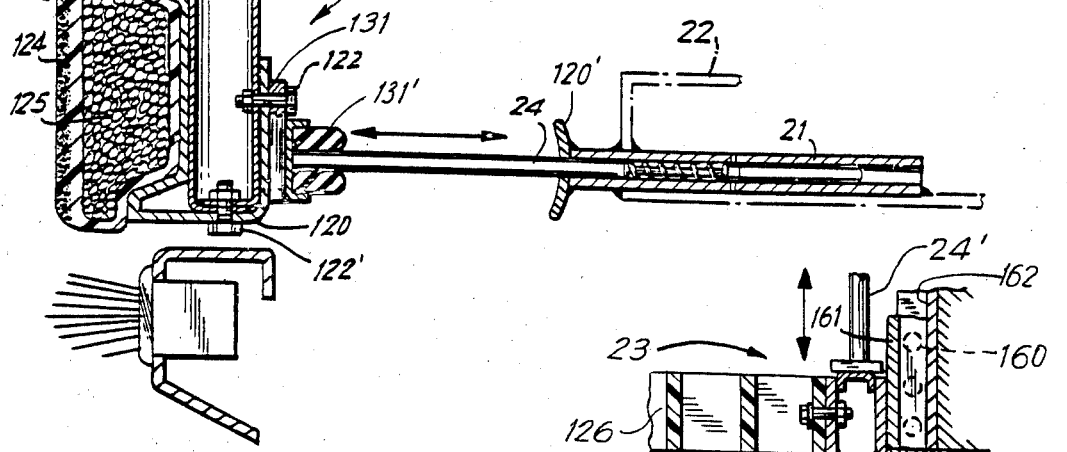
FIG. 17 is a plan view, in part section, as taken along line 17—17 of FIG. 15.

Disposed above the lower bumper frame 120 and between the two upright metal bumper guards 127 and incorporated in the upper portion is a combination grille and upper bumper assembly which is composed of a generally rectangular grille 126 moulded of high impact plastic with the outer edges reinforced. As can be appreciated, bumper guards 127 serve to protect the upper portion of the car from impact. As seen best in FIGS. 15, 16 and 17, each bumper guard 127 is affixed to lower bumper frame 120 in a frangible manner and is supported for additional stability by a pair of U-shaped, channel slides 161, 162, slideably connected to each other by means of ball bearings 160. A short channel 161 is fixed to the bumper guard 127 and the other channel suspension 162 is fixed rearwardly to the body of the car. This arrangement is especially useful for impacts involving trucks and trailers having high bumpers in the front and/or rear end. Also, this arrangement is assisted by the angling of the bumper rods 24, 24' to 2° above the horizontal axis of chassis frame 22 which serves to minimize the downward nose-diving of the front end of the car upon impact, for safety. Bumper guards 127 may be die drawn from a single piece of sheet metal such as steel.

The retractable bumper and coil spring assembly 20 may be designed to withstand the force of impact of a car travelling at 5 m.p.h. without damage to the car or injury to its occupants. It should also be noted that other means, such as a hydraulic cylinder, may be employed to absorb the shock of the main front bumper 123, upon impact. It should be noted that the headlamps and fenders are set back, relative to the grille (see FIG. 15) to reduce major damage to the vehicle.

For greater forces of impact, the shear pins 28 (FIG. 3) are designed to rupture, shear or snap so as to allow for further retraction of the bumper rods 24, and concurrently, of the rods 24' connected to the bumper guards 127. With a one inch (1") free bumper stroke the safety system is made operational in one (1) millisecond of time at relative collision speeds of 60 mph. As can be seen from FIG. 16, bumper rods 24' each have a toothed upper surface 29 at the upper end portion thereof which is in meshing engagement with a fixed pinion or pinion surface 31 of a common front alignment shaft 30 rotatably supported on the chassis frame (see FIGS. 5, 8 and 11). This serves to maintain proper bumper alignment and to ensure uniform bumper retraction, and, as can also be appreciated, the rear bumper assembly would be similar in construction to the front bumper assembly and would be coupled to a rear alignment shaft comparable to shaft 30.

Suitable resilient bumpers may be provided, such as rubber bumper 131', which contact suitable metal stops, such as stop 120', upon the complete retraction of main front bumper 123, as clearly seen in FIG. 16. In this manner the chassis frame 22 of the car is protected from damage in a severe collision.

The front bumper 23 and 123 (FIG. 16) may be coupled to and control a retractable steering column assembly 35 as seen in FIG. 2. As shown in FIGS. 2 and 2B, a substantially cylindrical steering wheel column housing support 36 is bolted to the floor board or fire wall 37 of the car. Telescopically and slidably received in housing support 36 is a steering column or shaft having an outer cylindrical tubular wall or sleeve 38 and an inner tubular wall or sleeve 39. Inner tubular sleeve 39 has a square-shaped inner channel in which a steering post or shaft 43 is securely mounted. Sleeve 39 is rotatably mounted in sleeve 36 so that steering post 43 may be turned to the left and right by means of upper and lower bearing assemblies 40 and 41. Sleeve 38 is slideably mounted in housing support 36 by means of bearings 41. Steering post 43 supports a steering wheel 42 and is telescopically and slidably received in a tubular extension 43', rotatably supported in housing support 36 by a ball bearing assembly 44, and which extends through the fire wall 37. A series of air vents 45 are provided in the lower end of housing support 36 for the purpose of preventing back pressure when the steering wheel column collapses downwardly for safety during a collision.

Pivotably supported on the inner surface of inner column 38 as seen in FIG. 2A, adjacent its lower end, is a latch device 46. Latch device 46 includes an L-shaped latch lever 47 normally held against cylinder wall 38 by a leaf spring 51. A plunger 52 fixed to the longer end of the latch lever 47, is held in a recess formed in the cylinder walls to lock-up both the inner and outer tubular columns 38 and 36. In this manner, the steering wheel column is supported in an extended position. The opposite end of latch lever 47 is secured to the end of cable 48, or it may be operable by other means such as pneumatics, etc. Cable 48, guided by pulleys 49, is coupled at its other end to a long stud 132 (best seen in FIGS. 5, 8 and 11). Upon response to retraction of main bumper 123, described hereinafter, the latch plunger 52 will be released from the cylinder walls and thus permit automatic collapse and the downward sliding of the steering wheel column for safety of the driver. As noted above, a series of round air vents 45 (FIG. 2) are provided in housing support 36 for the purpose of quickly releasing the air in steering column assembly 35 during the automatic collapse of the steering wheel column, upon impact of front bumper 23 and 123 in a collision.

The steering wheel 42 of the safety system, as shown in FIG. 7, will be seen to leave free an upper wide-arc segment 141 and a smaller lower segment 140 bounded by two arms 142. A circular instrument panel 143 is thus easily visible to the driver, without blocking out the directional signal lights when the steering wheel is turned to change lanes in traffic or on cornering. The circular instrument panel may be condensed using liquid crystal read-out and is provided with an optional magnifying glass face for easy reading. Circular instrument panel 143 is placed at the steering wheel hub, for instant and automatic downward collapse upon impact of the front bumper, for safety of the driver in a crash.

The safety system also includes essentially identical modified front and rear-end chassis suspension assemblies. FIGS. 4, 5, 8 and 11 illustrate only the portion of the front end chassis suspension system associated with the front right wheel of the vehicle, but it is to be understood that the other suspension assemblies are essentially the same. Thus, front suspension assembly 60 is coupled between chassis frame 22 and the conventional front end axle assembly of the front wheel and may include a conventional shock absorber (not shown) if desired. The basic air piston arrestor is shown in FIGS. 4 and 5, where each independent chassis suspension assembly includes a long stroke pneumatic piston arrestor pivotably suspended by means of a shock mount having a serrated ferrule (metal bushing) moulded with a rubber grommet and a metal collar, designated 210, secured to a square, supporting steel shank 59' with reinforcing rib extending from chassis frame 22 by means of lock nut 212. Post 60' extends from shock mount 210 and interconnects with air piston arrestor 60. The air piston arrestor includes an inner cylinder 63 having an air port opening 64, closely adjacent to its top end, and an air port opening 65, adjacent to its bottom end. A piston head 66 having a composite piston ring is attached to a piston rod 67 and is slidably received in cylinder 63 for generally vertical reciprocal movement therein. Cylinder 63 is, in turn, received in an outer jacket 68 having force fitted and bolted by bolts 68' upper and lower precision metal caps 69 and 70 which are embossed for self centering of inner and outer air cylinders and for piston alignment making for long wear, accuracy, simplicity and fool proof assembly. The space between cylinder 63 and jacket 68 is preferably kept as small as possible. A resilient sealer is applied to inside of upper and lower embossed caps, FIGS. 5, 8 and 11, to seal the bottom and top ends of cylinders 63 and 68, making unit air tight. A hard composite piston rod bearing 69' is fixed to the bottom of cylinder 63 and cooperates with baffle plate 72.

The lower end of piston rod 67 of the air piston arrestor is implemented as a pivotable joint 138 of steering knuckle 61 (FIGS. 4, 5, 5A and 11), which includes a split collar 139 and a pinch bolt 137 passing therethrough.

Fixed by means of key slots 216 (FIG. 6A) to each of the ends of shaft 30 is a cam 53 having a generally circular periphery except for a single inwardly curved, notched portion 54 (FIG. 6). A lock nut 55 is threadably received on each end of shaft 30, outwardly of cams 53. As shown in FIGS. 5 and 6, a cam follower 59 is normally received in the notch portion 54 of the cam 53. The cam follower 59 is in turn coupled to the bracket assembly 71, which is integral with an elongated plunger bar 77. Plunger bar 77 is received through opening 70' and seal 71' in cap 69 into the space between cylinder 63 and jacket 68 and extends substantially the length of cylinder 63. The plunger bar 77 is provided on its inner surface with upper and lower shutter closing plates 75 and 76, made of a composite or plastic, serving in one stroke of the bar 77, shown in FIG. 11, to close the upper and lower air port openings 64 and 65, respectively and simultaneously.

Thus, the plunger bar 77 is mounted inside the outer jacket 68 for vertical reciprocal movement between an open position (FIG. 5) and a closed position (FIG. 11), relative to air port openings 64 and 65. The bar 77 is normally retained in its upper position by the biasing force of a compression coil spring 80, interposed between the upper portion of the bracket 71 and the top of embossed cap 69. In order to vertically guide bar 77 a stud or pin 64' is provided extending inwardly from jacket 68 which engages with vertically elongated slot 65' in plunger bar 77, as clearly seen in FIG. 12.

When cam 53 is in its normal position, the cam follower 59 is held in biased engagement and received, under the force of coil spring 80, within notched portion 54 of cam 53 and it, in turn, will hold shutters 75 and 76, in an open position, relative to port openings 64 and 65, respectively. In this position, the air piston arrestor will function as a non-vibrational chassis suspension damping device. However, upon frontal impact, in a collision, when the cam 53 is rotated, the cam follower 59 will be forced out of the notched portion 54 and will, in turn, push plunger bar 77 and, consequently, shutters 75 and 76 downwardly (FIG. 11), causing them to close port openings 64 and 65, respectively. As a result, any movement of piston head 66 and connecting rod 67 in cylinder 63, acting under air pressure will be arrested in a substantially rigid, non-compressible state, thereby locking the front bumper height. The same will, of course, hold true for the rear suspension system and the rear bumper during a rear end collision. Also, as plunger bar 77 is thus pushed downwardly, stud 132 secured to bracket assembly 71 is simultaneously pushed downwardly causing cable 48 to move in the direction of the arrow in FIG. 11. This movement of cable 48 which is transmitted through pulleys 49 results in collapse of steering wheel 42 as hereinabove described. Such movement of cable 48, resulting from the impact of a collision may also be utilized to trigger other safety related devices which are to be activated upon the impact of a collision. This triggering of the system occurs within one millisecond at sixty m.p.h. with a mere one inch bumper stroke. Thus, activation of the safety system results almost instantly from the time of a collision.

In order to prevent the air cylinder arrestor from rotating about its axis as a result of vibration, a rod 60' is provided extending vertically from upper embossed cap 69 and to shock mount assembly 210 with the horizontal supporting shank 59' which is fixed to the chassis frame leg 22, FIG. 5.

The present invention also provides for an alternate manner of actuation of the air piston arrestors. As shown in FIGS. 5, 8 and 11, mounted within the inner cylinder 63, at the upper end, is cylinder head 72, formed with an air port opening 72'. Electro-magnetic solenoid 81 having a reciprocably-movable plunger 82 with a rubber stopper at bottom end is provided to engage with air port opening 72'. The plunger 82 of solenoid 81 is urged upwardly by a biasing spring 82' normally preventing closure of the air port opening 72' as seen in FIG. 8. Consequently, upon activation of the coil 81 a magnetic field will be established which will cause the core or plunger 82 to move downwardly, so as to close the air port opening 72'.

As shown in FIG. 14, the wire leads 83 for each of the coils 81, associated with the air piston arrestors for the left side front and rear tires and the right side front and rear tires, respectively, are coupled in parallel and are connected to microswitches 84 and 84'. Switch 84 is situated at the break pedal and is activated during braking and emergency stopping situations. Switch 84' is a back-up microswitch and is activated by the retracting movement of bumper 123 during a collision. Microswitches 84 and 84' are connected in parallel to each other and in series with the car's battery-generator system 85. Thus, upon stepping on the brake pedal or during a collision, microswitches 84 or 84' will close the electrical circuit and will, in turn, activate the coils 81, thereby locking the front and rear suspensions in a rigid manner via the air piston arrestors, throwing the full weight of the upper chassis and load, including the motor, etc., directly on all tires held rigid against the road surface, for better traction in all kinds of weather conditions.

A four-way mercury tilt and sway sensor contact switch 86 is connected to and activated by the vehicle's starter switch 87 which activates the electrical circuits due to the fact that switch 87 completes the circuit of a switch 86 to the negative battery ground via line 96. Switch 87 is, of course, coupled to the battery system via wire leads 95 and 96, the arrows indicating the leads to the motor starter electrical system. Mercury switch 86 is used to control current flow to the magnetic coils 81. This system is preferably deactivated when the ignition is off in order to conserve the battery if the vehicle is parked on a slope, etc. Referring to FIG. 14B, if the car pitches or leans downwardly to an undesirable extent to the left, the mercury will bridge the left contact 90 and center contact 89, activating the warning signals 93, 93' and energizing all the coils 81 via wire leads 94, 94' to prevent the car from pitching or leaning. If, on the other hand, the car pitches or leans downwardly to the right, the same action takes place with the mercury electrically bridging the center contact 89 and right contact 88 and all the coils 81 and signal lights 93', 93 will be activated via wire leads 94', 94. If the car pitches or leans forward, the mercury electrically bridges the center contact 89 and front contact 90' thereby energizing all the coils 81 and signal lights 93, 93' via wire leads 94" which interconnect leads C and D which in turn are interconnected with leads A and B, respectively, as seen in FIG. 14. Likewise, if the car pitches or leans rearward, the mercury electrically bridges the center contact 89 and rear contact 88' thereby energizing all the coils 81 and signal lights 93, 93' via wire leads 94" which interconnect leads C and D which in turn are interconnected with leads A and B, respectively, as seen in FIG. 14. Thus, by the use of this mercury switch 86, an automatic tilt control, wind and load, anti-sway unit is provided which eliminates the need for conventional front and rear anti-sway or anti-roll bars. Such elimination of front and rear anti-sway or anti-roll bars results in a substantial savings in cost, labor and automobile weight.

The mercury sensor switch 86 is preferably encased in a glass or plastic capsule 92' and mounted in an insulated casing 92 containing an insulation filler, such as glass wool, poly-urethane, asbestos, etc., to protect it against hot and cold temperatures, and is positioned in the roof at the rear uppermost part of the vehicle. It may preferably include an electrically non-conducting partition or plate 91 to control undesirable sloshing or splashing of the mercury having small openings or passages 91' at each extreme corner to permit the mercury to make contact with contacts 88, 90, 88' or 90' as described.

According to the embodiment of the air piston arrestors shown in FIGS. 8 and 11, a compressed air line 97 is connected to the interior of cylinder 63 of the air piston arrestors by an air valve 98 (FIG. 10). Hose 97 is connected to a compressed air source (not shown) located on the vehicle via a manually controlled air regulator valve 99 (FIG. 14), preferably located in the driver's compartment out of harms way, which also pneumatically actuates an electrical switch 100 via a conventional diaphragm or bellows pressure device 101 which is also fed compressed air upon opening of valve 99.

As shown in FIG. 14, a switch 100 bypasses switches 84 and 84' and is connected to wire leads 83, 83' via wire leads 102, 102', respectively, so as to serve as an alternate means of activating solenoid coils 81 of the air piston arrestors to thereby close air ports 72'. Switch 100 may be closed by toggle switch 118 for manual operation during bad weather road conditions to put dead weight on all wheels of the vehicle by locking rigid the suspension systems. If desired, when switch 100 is closed, manually controlled air regulator valve 99 may be operated to feed compressed air via compressed air line 97 in the direction of the arrows shown in FIG. 14 to air feed valve 98 (FIG. 10). Alternatively, the vehicle operator may operate or open air regulator valve 99 to thereby feed compressed air to the air piston arrestors which will simultaneously pneumatically actuate electrical switch 100 via a conventional diaphragm or bellows pressure device 101. A pressure gauge 103 may be connected to the air line 97 to monitor the air pressure. This gauge would also be conveniently located in the driver's compartment out of harms way. The force of the compressed air would cause brass air thimble 104 of air feed valve 98 to move against the biasing action of spring 106' in the direction of the arrow (FIG. 10), thereby causing the rubber valve head or stopper 105 at the opposite end of shaft 106 to move off the valve seat defined on the bored cylindrical fixed plug 107 mounted in valve housing 108 and to allow the compressed air to enter cylinder 63 above piston 66 and thus enhance the rigidity of the air piston arrestors. Depending on the pressure supplied, this may also be used to raise the car chassis by causing further extension of piston rod 67 or to allow for greater loads to be placed thereon.

As shown in FIG. 11 and in greater detail in FIG. 13, the air piston arrestors each include an air release valve 110 for venting the pressurized air within the outer jacket 68 and, in turn, cylinder 63. Valve 110 includes a generally flat tension spring 111 secured at one end by a rivet 117 to outer jacket 68. Spring 111 is held thereagainst in an adjustable manner by means of a lock nut 112 fixed to the inner wall of jacket 68 and an adjustment screw 113 extending through aligned bores provided in jacket 68 and spring 111. The other end of spring 111 has a round rubber bumper or plug 114 loosely secured thereto by means of insert rivet 116. Plug 114 is disposed for mating biased receipt with an inwardly tapered, frustoconical valve seat 115 recessed in the wall of jacket 68. The loose mounting of plug 114 serves to ensure that plug 114 will always mate properly with valve seat 115 regardless of the adjusted spring pressure.

As can be readily appreciated, release of plug 114 from valve seat 115 and the venting of the opening thereof defined by valve seat 115 will be automatically effected if the inside cylinder pressure is greater than the spring pressure, the latter of which may be adjusted by adjustment screw 113. The spring tension will be set by the installer so as to effect the release of air from within cylinder 63, after manual pressurization of the air piston arrestors by means of valve 99, automatically to the lower operating air pressure, for normal cruising of the vehicle. This occurs upon opening of electrical circuit by the manual toggle switch 118, thereby allowing the venting of cylinder 63 through air port opening 72' and, in turn, valve 110, see FIGS. 13 and 14.

Turning now to the overall operation, under normal driving conditions, the safety system is effectively inoperative with retractable front bumper 23 and main front bumper 123 in extended positions, and shutters 75, 76 (FIG. 5) in an open position relative to vent openings 64, 65, so that the air piston arrestors operate only as a chassis suspension damping device under normal cruising conditions. However, when bumper 123 strikes a wall 19 or another relatively immovable object, bumper rods 24, 24' will retract within bumper support arms 21, 21' causing shaft 30 (FIG. 5) to rotate. Rotation of shaft 30 will cause rotation of cams 53 (FIGS. 5 and 6) which, through cam follower 59, will move shutters 75, 76 to a closing position relative to air vent openings 64 and 65, respectively. Consequently, the air piston arrestors will be arrested in a relatively non-compression state to eliminate nose-diving of the car. Simultaneously, microswitch 84' (FIG. 14), closed by the retraction of main bumper 123 or the pitching of the car which activates four-way mercury switch 86, will cause the activation of solenoids 81 and the closing of air port openings 72' thereby arresting the air piston arrestors. Simultaneously with the rotation of cams 53, stud 132 is moved downwardly thereby moving cable 48 or operable by other means such as pneumatics, etc., and causing the collapse of steering wheel 42 as shown by the arrows in FIG. 2.

Furthermore, in an emergency braking situation, microswitch 84 (FIG. 14) will be activated to effect locking of the air piston arrestors and, as the car is driven normally, mercury switch 86 will automatically serve to maintain the car's equilibrium. Finally, the safety system may be optionally manually activated by valve 99 (FIG. 14), which also feeds compressed air to the head space of cylinders 63 so as to allow for greater loads or to raise the chassis and passenger compartment in the case of floods, high snow drifts, etc. A make or break circuit electrical switch may be activated upon opening of the car door to arrest the piston heads of the air cylinders thus preventing collapse of the chassis suspension systems when loading or the entering of passengers, thereby stabilizing the passenger compartment of the vehicle without dipping or leaning. This is also beneficial when loading passengers at a high curb.

It is to be noted that the air piston arrestors, operating as a damping device for the car's spring suspension system, act in conjunction with, and are monitored by the electrical impulses of the tilt and sway mercury switch sensor of the vehicle control safety system. Instantly upon impact of a front end collision, the car's spring suspension system is automatically placed in a rigid non-compressible state by the safety system's mechanism and, as described in my co-pending U.S. Ser. No. 579,689 filed on even date herewith, the driver and passengers are simultaneously moved forward in equilibrium in a controlled sitting position for safety against protective thick padded interior static barriers of the vehicle dashboard.

Furthermore, it should be noted that the air confined in the dual cylinder jackets of air piston arrestors 60 flows in and out of the air ports in a recyclating manner and compressor air is used only occasionally for the operation of the safety system.

The front forward padded compartment of the dashboard should be designed free of instrumentation and/or projections for safety.

It should, of course, be appreciated that various modifications may be made as will be apparent to those skilled in the art. For example, although it is preferable to use solenoids for activating the air piston arrestors, other electro-mechanical means, such as electromagnetic or electro-pneumatic devices, could be used. In addition, other wiring arrangements for the various alternate activation systems may be possible. Further, the diameter of the cylinder piston heads will normally be determined by the vehicle's upper weight and load. Moreover, the configuration and construction of the bumper assembly may be modified to suit a particular application.

Thus, while several embodiments of the present invention have been shown and described, it will be obvious that many changes and modifications may be made thereunto, without departing from the spirit and scope of the invention.

What is claimed is:

1. A safety system for a vehicle having a chassis with two parallel substantially horizontal spaced-apart lower chassis frame extension legs and two parallel substantially horizontal spaced-apart upper chassis frame extension legs associated with the front and rear ends of said vehicle and an axle assembly for each of the wheels, comprising:
   a suspension assembly for each axle assembly including a cylinder and an air piston normally movable in said cylinder, said cylinder being pivotably coupled to said chassis and said air piston being pivotably coupled to said axle assembly, said cylinder being formed with at least one air port opening;
   valve means for selectively opening and closing said at least one air port opening so as to arrest the movement of said air piston in said cylinder, and to maintain said piston in a relatively rigid, non-compressible state when said air port opening is closed, including biasing means urging said valve means to open said air port opening;
   means for activating the closing of said valve means; and
   at least one bumper assembly including a short stroke retractable bumper slidably mounted on said chassis for movement between a normal, extended position and a retracted position, by means of a first pair of generally parallel, spaced-apart hollow support arms, each of which being mounted to one of said lower chassis frame extension legs and a second pair of generally parallel, spaced-apart hollow support arms, each of which being mounted to one of said upper chassis frame extension legs, and a pair of lower and a pair of upper generally parallel, spaced-apart rods connected to said bumper, each of which being telescopically received in a corresponding one of said hollow support arms.

2. The system according to claim 1, which further includes biasing means for biasing said lower pair of rods in said support arms to said normal, extended position.

3. The system according to claim 2, wherein said biasing means comprises a collar releasably mounted in each of said lower support arms and a coil spring disposed between each of said collars and the associated bumper rod received in said support arm and further including a shear pin associated with each bumper rod which is sheared upon the full compression of said coil spring.

4. The system according to claim 3, which further includes resilient bumper means associated with said bumper rods of said lower support arms for preventing damage to said chassis upon full retraction of said retractable bumper.

5. The system according to claim 1, wherein the means for activating the closing of said valve means includes said upper rods of said bumper having inner ends provided with a toothed upper surface, said chassis including a rotatable main shaft mounted thereon having a pinion surface in mesh with the toothed upper surface of each of said upper rods and means interconnecting said pion surface with said valve means.

6. The system according to claim 5, wherein the means interconnecting said pinion surface with said valve means includes cam means operated by said rotatable main shaft.

7. The system according to claim 6, which further includes a plunger operated by said cam means and having a shutter for closing said at least one air port upon movement of said cam in response to retraction of said bumper.

8. The system according to claim 7, wherein two air ports are provided, a first air port near the top of said cylinder and a second air port near the bottom of said cylinder and wherein said plunger includes a first shutter and a second shutter for closing said air ports.

9. The system according to claim 8, which further includes a sealed jacket around said cylinder defining a space therebetween, a cylinder head in said cylinder having a normally open valve opening therein, said first valve port being positioned above said cylinder head, and electromagnetically operated valve means including switch means activated by the retraction of said bumper for closing said cylinder head valve opening upon the retraction of said bumper.

10. The system according to claim 9, wherein said sealed jacket includes a circumferential jacket cylinder surrounding said air piston cylinder, the top and bottom of said cylinders being fixed to one another by embossed, precision metal caps, force fittingly engaging the tops and bottoms of said cylinders respectively so as to define a space between said cylinders for accurate self-alignment thereof.

11. The system according to claim 10, wherein said electromagnetically operated valve means further includes switch means activated by the pitching of said vehicle for closing said cylinder head valve opening upon the pitching of said vehicle, and said sealed jacket including a pressure adjustable vent means to the atmosphere.

12. The system according to claim 11, wherein the switch means activated by the pitching of said vehicle includes a four-way mercury switch wherein contact is made within said switch upon the pitch of said vehicle in any direction and which includes an electrically non-conducting partition therein having small openings at each extreme corner to prevent splashing of the mercury in said switch while permitting electrical contact at the extreme corners thereof.

13. The system according to claim 10, wherein said electromagnetically operated valve means further includes switch means activated by the application of the brakes of said vehicle, and said sealed jacket including a pressure adjustable vent means to the atmosphere.

14. The system according to claim 10, which further includes means for introducing compressed air into the cylinder of each suspension assembly operated by a manually operated air valve, switch means activated by the introduction of said compressed air for activating said electromagnetically operated valve means for closing said cylinder head valve opening, and said sealed jacket including a pressure adjustable vent means to the atmosphere.

15. The system according to claim 10, wherein said electromagnetically operated valve means includes a solenoid having a moveable core which opens and closes said valve opening and which is biased to open said valve opening when said solenoid is not activated.

16. The system according to claim 1, wherein the means for activating the closing of said valve means includes an electromagnetic coil and switch means for energizing said coil when said bumper retracts.

17. The system according to claim 1, wherein the means for activating the closing of said valve means includes an electromagnetic coil and switch means for energizing said coil when said vehicle pitches.

18. The system according to claim 17, wherein said switch means includes a four-way mercury switch wherein contact is made within said switch upon the pitch of said vehicle in any direction and which includes an electrically non-conducting partition therein having small openings at each extreme corner to prevent splashing of the mercury in said switch while permitting electrical contact at the extreme corners thereof.

19. The system according to claim 18, wherein said switch means is activated by the application of the brakes of said vehicle.

20. The system according to claim 1, which further includes means for introducing compressed air into the cylinder of each suspension assembly.

21. The system according to claim 1, wherein said spaced-apart hollow support arms and said rods telescopically received therein are inclined upwardly to the horizontal.

22. The system according to claim 21, wherein said upward inclination is 2°.

23. The system according to claim 6, which further includes a retractable steering wheel column assembly comprising a steering column housing, and a steering column slidably received in said steering column housing and movable between an extended and retracted position, and means operatively connected to said bumper assembly for permitting said steering column to move from said extended to said retracted position in response to the movement of said bumper from said normal position to said retracted position.

24. The system according to claim 23, wherein said means for permitting the movement of said steering column includes a pivotable latch mounted on said steering column having a latch plunger which releasably engages with said column housing to maintain said steering column in an extended position, and a cable, one end of which is secured to said latch and the other end of which is operatively connected to said cam means so as to release the engagement of said latch plunger with said steering column housing to permit retraction and collapse of the steering wheel upon movement of said bumper to a retracted position.

25. The system according to claim 1, which further includes a retractable steering wheel column assembly comprising a steering column housing, and a steering column slidably received in said steering column housing and movable between an extended and retracted position, and means operatively connected to said bumper assembly for permitting said steering column to move from said extended to said retracted position in response to the movement of said bumper from said normal position to said retracted position.

26. The system according to claim 25, wherein said means for permitting the movement of said steering column includes a pivotable latch mounted on said steering column having a latch plunger which releasably engages with said column housing to maintain said shaft in an extended position, and a cable, one end of which is secured to said latch and the other end of which is operatively connected to said bumper assembly so as to release the engagement of said latch plunger with said steering column housing to permit retraction and collapse of the steering wheel upon movement of said bumper to a retracted position.

27. The system according to claim 1, wherein said bumper comprises a lower bumper assembly comprising a horizontally-extending main bumper to which is attached a bumper frame and an upper bumper assembly secured to said frame of said lower bumper assembly comprising a grille panel and a pair of vertically-extending, horizontally-spaced-apart auxiliary bumper guards disposed above said main bumper.

28. The system according to claim 27, wherein said main bumper is composed of a resilient plastic casing filled with a polyurethane foam and wherein said upper bumper guards are made of die drawn sheet metal.

* * * * *